United States Patent [19]

Clark et al.

[11] 4,282,909
[45] Aug. 11, 1981

[54] AERIAL REFUELING DEVICE

[75] Inventors: Charles R. Clark, Mission Viejo; Lowell R. Hanson, Lakewood; Gerald G. Steele, Mission Viejo, all of Calif.

[73] Assignee: Parker-Hannifin Corporation, Cleveland, Ohio

[21] Appl. No.: 9,213

[22] Filed: Feb. 5, 1979

[51] Int. Cl.³ .......................... B65B 3/04; B64D 39/06
[52] U.S. Cl. ...................................... 141/98; 141/231; 141/311 R; 244/135 A
[58] Field of Search ................. 137/614.05; 141/1, 94, 141/98, 231, 269, 284, 311 R, 325, 326, 346–350, 382, 386, 392; 244/135 R, 135 A

[56] References Cited
U.S. PATENT DOCUMENTS 4,126,162  11/1978  Clark ........................................ 141/98

Primary Examiner—Frederick R. Schmidt
Attorney, Agent, or Firm—James A. Baker

[57] ABSTRACT

A device for opening a door on an aircraft to expose a receptacle for receiving a fueling nozzle on another aircraft so that the first mentioned aircraft can be refueled in flight. The device has a hydraulically operated actuator for opening and closing the door and another hydraulically operated actuator for locking and unlocking latches engageable with the nozzle for holding it in the receptacle. The hydraulic system has a single valve for controlling flow of pressurized fluid through a single conduit to the door actuator for both door opening and door closing movement of the actuator piston. When closed, this valve isolates the hydraulic system from the pressure source so that no part of the hydraulic system is pressurized when the device is not in operation.

46 Claims, 8 Drawing Figures

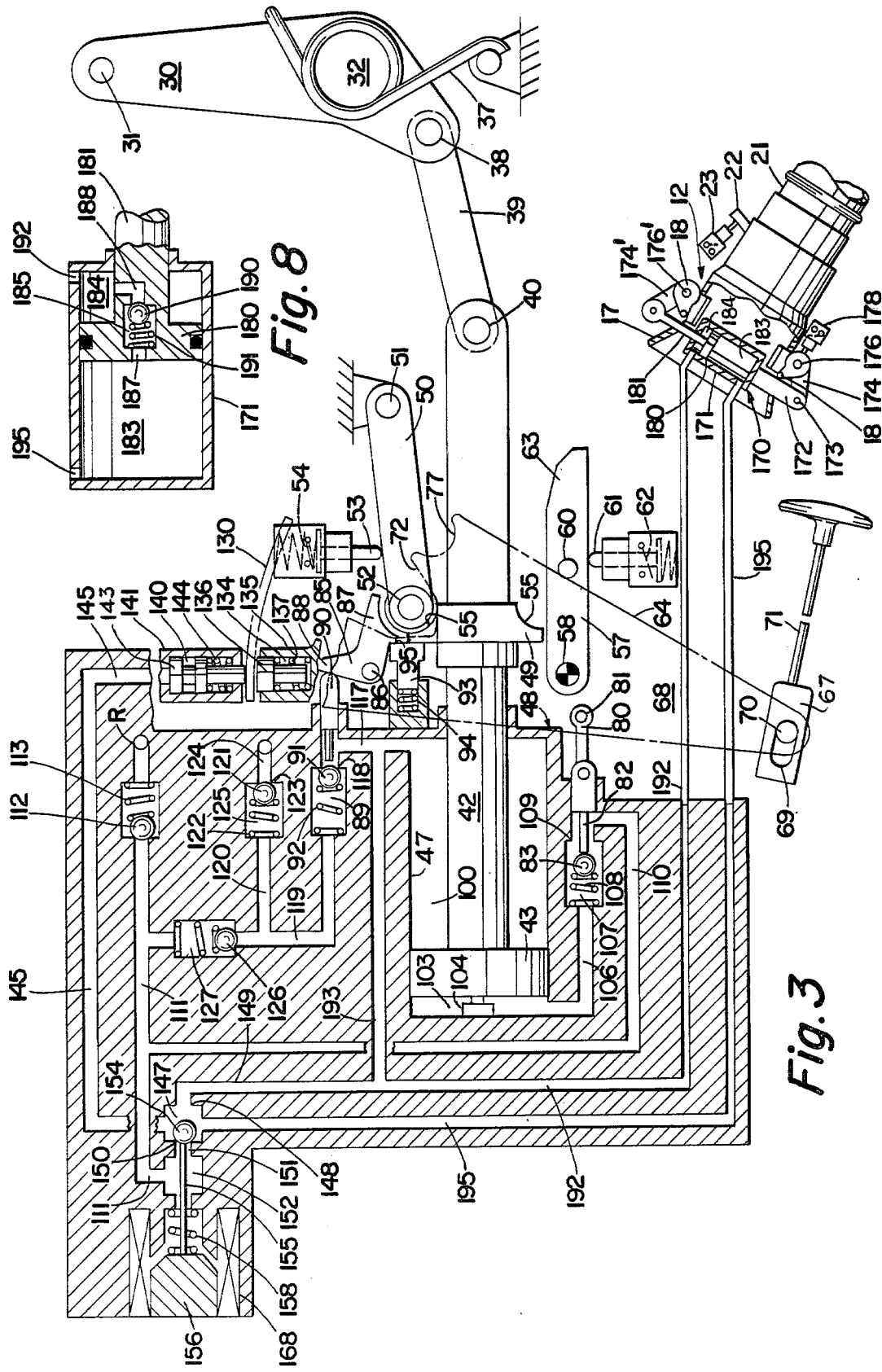

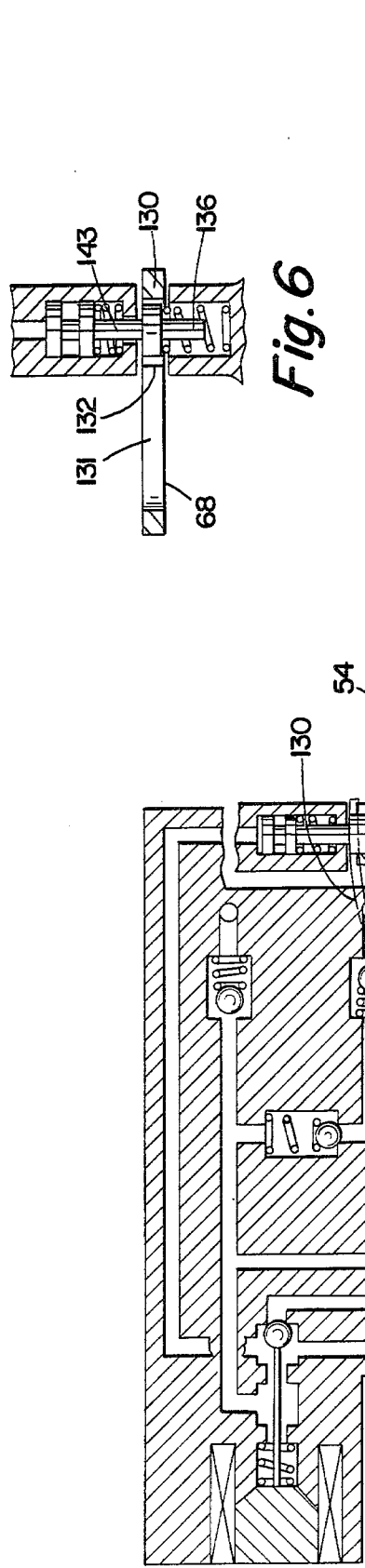
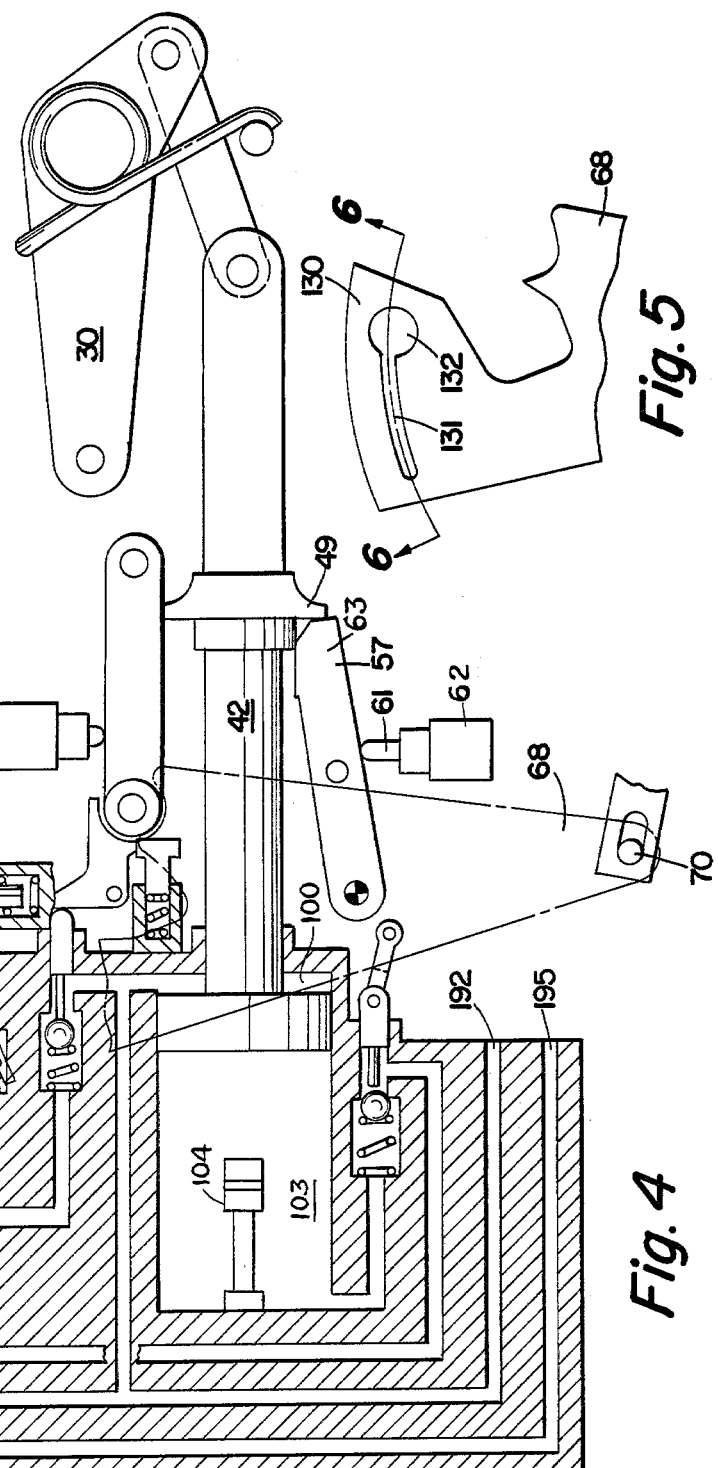

AERIAL REFUELING DEVICE

FIELD OF THE INVENTION

This invention relates to in-flight airplane refueling devices of the general type shown in U.S. Pat. No. 2,859,002 wherein a nozzle deployed from a tanker airplane connects to a receptacle mounted in an airplane to be refueled whereby fuel may be transferred from the tanker airplane to the receiving airplane. More particularly, the invention relates to a mechanism for opening a door on the receiving airplane for exposing the receptacle to which the nozzle attaches for transfer of fuel. Two forms of such door opening mechanisms are shown in U.S. Pat. Nos. 2,938,688 and 4,126,162.

BACKGROUND OF THE INVENTION

In the prior door opening mechanism of U.S. Pat. No. 4,126,162 there is a hydraulic door actuator with a mechanical means for locking the same in its position when the door is closed and another means for simultaneously directing hydraulic fluid to one side of the door actuator piston for also holding the door actuator in its door closed position. A manually operated means is operable for simultaneously unlocking the door actuator from its door closed position and for opening a valve to direct pressure fluid to the other side of the piston to move the piston toward door opening position. It has been found that it is unnecessary to retain fluid pressure in the door actuator for holding it in door closing position when the mechanical means is locking the actuator in its door closed position. Also, it is undesirable in any hydraulic system to unnecessarily subject any portion thereto to high fluid pressure.

In another prior art refueling door opening device a manually operated rotary cam shaft when rotated to one position opens a first valve to connect a pressure source to a first conduit that is connected to one side of a door opening actuator and opens a second valve to connect a reservoir to a second conduit connected to the other side of the actuator. When rotated to another position the cam shaft opens a third valve to connect the pressure source to the second conduit and opens a fourth valve to connect the reservoir to the first conduit.

SUMMARY OF THE INVENTION

The present invention is an improvement over the prior art devices referred to above. It utilizes only a single valve for connecting a single conduit connected to the door actuator for both opening and closing movements of the door. In addition, when the door is fully closed and latched there is no fluid pressure in the actuator for holding the door closed nor is any portion of the hydraulic system pressurized.

DESCRIPTION OF THE DRAWINGS

FIG. 3 is a schematic view of the door opening and nozzle latching device when the door is closed and the latches are open. In this view, as well as in FIG. 4, a portion 130 of cam arm 68 is broken away and with cooperating locks 143 and 136 is rotated 90°.

FIG. 4 is view like FIG. 2, but showing the device in the door open and latch closed positions.

FIG. 5 is a side view of portion 130 the cam arm 68 in its true position relative to arm 68.

FIG. 6 is a second 6—6 of FIG. 5 but adding locks 143 and 136.

FIG. 8 is a cross section view of the latching actuator.

DETAIL DESCRIPTION

Figure 1:
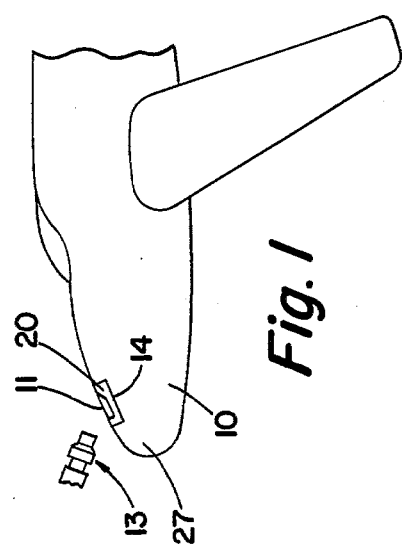
FIG. 1 is a view of an aircraft fitted with a box having a door to expose a refueling receptable in the box.
Figure 7:
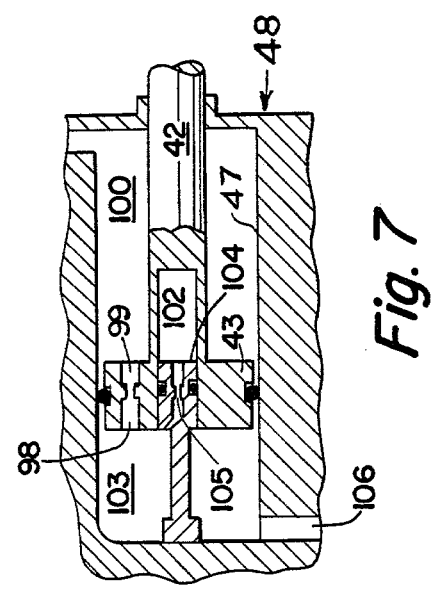
FIG. 7 is a view showing the door lock actuator in cross section.

As shown in FIG. 1 a receiver aircraft 10 has a box 14 fitted and secured within its nose 27 by suitable brackets and screws that are not shown. Box 14 has a door 11 that may be opened inwardly to expose a receptacle 12, see FIG. 2. A nozzle 13 trailing from a tanker aircraft is about to be connected to the receptacle for transfer of fuel to the receiver aircraft 10.

The receptacle 12 has a hollow housing 17 to receive the forward portion of nozzle 13 and has two equally spaced latches 18 that project through openings in housing 17 to engage in a groove 19 of the nozzle for locking the nozzle to the receptacle housing 17.

Figure 2:
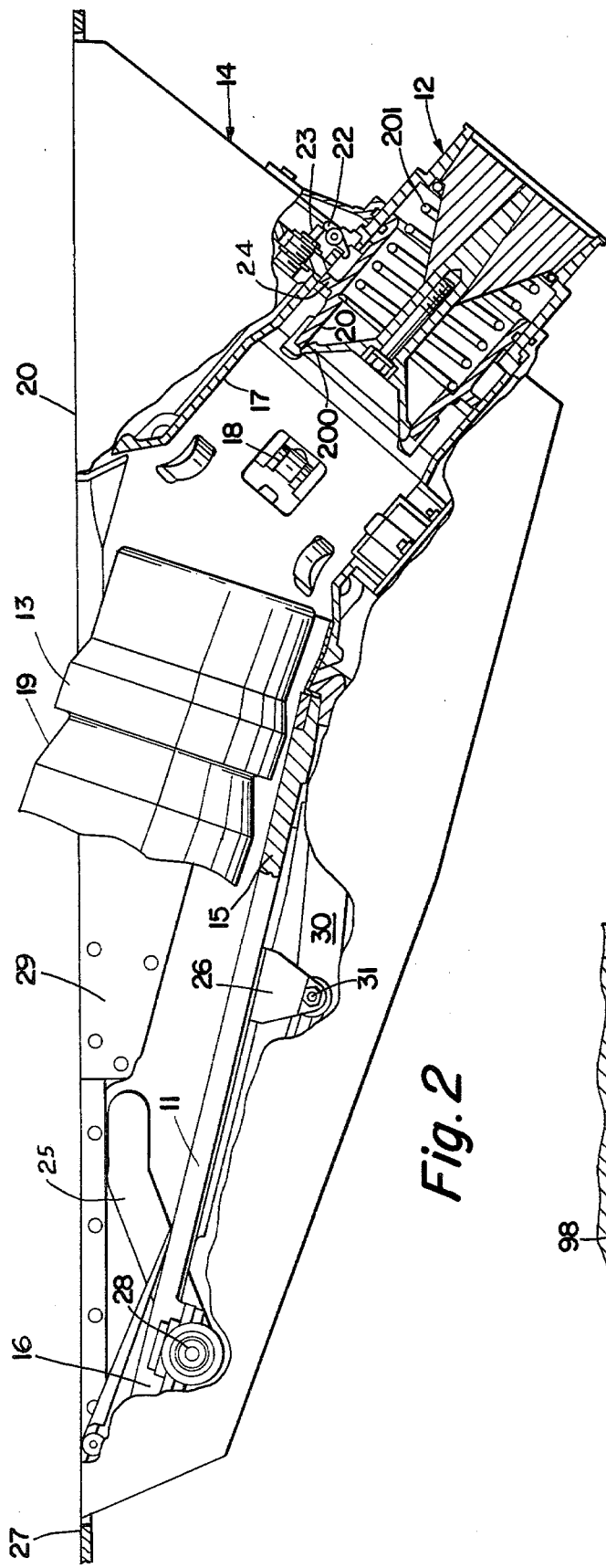
FIG. 2 is side view, partly in cross section, of the box containing the door opening and nozzle latching device and showing the door open and with the nozzle about to make contact with the receiver housing.

The receptacle 12 has a sleeve valve 20 that is engaged by the end of nozzle 13 to open the same whereby fuel may be transferred through receptacle 12 to a conduit 21 leading to the fuel tanks of the receiver aircraft. Receptacle 12 has a pivoted arm 22 which is engaged by a flange 24 on valve 20 when the latter is in its opened position to close a switch 23 to close an electric circuit for energizing a solenoid 168 shown in FIG. 3. Door 11 when in closed position fits flush with the upper surface 20 of the box 14 and the latter surface fits flush with the upper surface 27 of the airplane nose. As shown in FIG. 2 door 11 at its forward end 16 carries a pair of trunnions 28, one on either side of the door, and the trunnions ride in slots 25 on either side of the box so that the rearward end 15 of the door may move forwardly and downwardly while the rearward portion of the door swings downwardly. This exposes receptacle housing 12 which is mounted within the box as shown in FIG. 2. Door 11, when in open position acts as a slipway or guide for directing nozzle 13 into proper engagement with receptacle 12. Side plates 29 on each side of door 11 also serve to guide the nozzle to the receptacle.

Intermediate its ends, door 11 carries a bracket 26 to which a door arm is pivotally connected at 31. As shown in FIG. 3, arm 30 is pivotally mounted on a shaft 32 carried by box 14. Arm 30 is constantly urged in a counter clockwise direction about shaft 32 by a torsion spring 37 and it has a pivotal connection at 38 to a link 39 which in turn has a pivotal connection at 40 to the outer end of a piston rod 42 attached to a piston 43 mounted within a cylinder 47 of a door hydraulic actuator generally designated 48. Mounted on the outer end of rod 42 is a lock collar 49. When the parts of the door opening device are in the door closed position, as shown in FIG. 3, piston rod 42 is retained in its retracted position by a first locking means comprising a link 50 pivotally connected at one end to a pin 51 stationarily mounted in box 14 and which at its other end has a roller 52 that engages an outwardly facing surface 55 of collar 49. Link 50 is engaged by a spring pressed plunger 53 which operates a switch 54.

In the retracted position of rod 42, collar 49 is adjacent to the upper surface of link 57 which comprises a second locking means for locking rod 42 in its extended position by engagement of its free end 63 with collar 49 when door 11 is open, as shown in FIG. 4. Link 57 is pivotally connected at one of its ends to a pin 58 that is stationarily mounted in box 14. Intermediate its ends link 57 is engaged by a spring pressed plunger 61 of a switch 62 that normally urges link 57 to pivot in a counter clockwise direction around pin 58. In the door closed position of FIG. 3, counter clockwise rotation of link 57 is prevented by engagement of pin 60 with an inclined edge 64 of a cam arm 68 that it is likewise pivotally mounted on pin 58. When link 57 is moved by plunger 61 to its position shown in FIG. 4, switch 62 is closed for energizing a signal light (not shown) to indicate that the door is in a locked open position.

Cam arm 68 is connected via pin 70 by a lost motion connection 69 in a link 67 to a cable 71. Cam arm 68 has a cam surface 72 engageable with roller 52 for raising roller 52 out of engagement with collar surface 55 and it has a detent groove 77 to receive roller 52 for maintaining roller 52 in an upper unlock position relative to collar 49 to permit cylinder rod 42 to be moved to its extended position shown in FIG. 4. Cable 71 is within a tube, not shown, so that it may be pushed as well as pulled for moving arm 68.

Cam arm 68 has another link 80 pivotally connected thereto at 81. The other end of link 80 is pivotally connected to a rod 82 for actuating a ball valve 83. A rocker 85 is pivotally mounted on a pin 86 that is stationarily mounted in box 14. Rocker 85 has one arm 87 that is engageable with roller 52 and has another arm 88 that is engaged by a plunger 90 that is engageable with a spring pressed ball valve 91 in a valve chamber 89. When the mechanism is in the door closed position of FIG. 3, collar 49 retracts a plunger 93 against pressure of a spring 94 which permits rocker 85 to be in its position of clockwise rotation and to be held therein by engagement of plunger 93 with a tab 95 on rocker 85 and thus prevent counter clockwise motion of rocker 85 which would otherwise cause valve 91 to be unseated.

Piston rod 42 has an opening 98 connecting chamber 100 on one side of piston 43 to a chamber 103 via an orifice 99. Piston 43 and rod 42 have a chamber 102 closed by a plug 104 rigidly secured to the end wall of cylinder 48 that also has an orifice 105 connecting chamber 102 and 103. Chamber 103 is connected by conduit 106 to one end of a chamber 107 that contains spring 108 and ball valve 83. The other end of chamber 107 has a valve seat 109 leading to conduit 110 that connects to a return conduit 111 that leads to a reservoir R and has a check valve 112 therein that normally closes conduit 111 under pressure of spring 113.

Chamber 100 is connected by conduit 117 to a valve seat 118 in chamber 89 and the latter is connected by conduit 119 to a conduit 120 leading to a chamber 125 that contains a ball valve 121 that is normally pressed by spring 122 against a seat 123 that leads to a pressure inlet conduit 124. A thermal relief valve 126 in chamber 127 is provided for relieving excess pressure in conduit 119 to return line 111.

At its upper end 130 cam arm 68 has a narrow slot 131 that intersects an opening 132. Mounted in a recess 134 in a boss 135 stationarily attached to box 14 is a plunger 136 pressed outwardly toward one side of cam arm 68 by a spring 137. Mounted in a chamber 140 of another boss 141 stationary on box 14 on the other side of cam arm 68 is another plunger 143 that is pressed by spring 144 in a direction away from arm 68. A conduit 145 connects the upper end of chamber 140 to a valve chamber 147 that has a seat 148 leading to a conduit 149 and which has another seat 150 leading to a conduit 151 that connects to an elongated chamber 152 to which conduit 111 also connects. Within chamber 147 is a ball valve 154 movable by a pin 155 that is connected to armature 156 of solenoid 168 and which is pressed in the left hand direction by spring 158 when solenoid 168 is deenergized and thereby permitting ball valve 154 to engage seat 150 to close conduit 151.

To actuate latches 18 a latch cylinder generally designated 170 is provided. This cylinder has a housing 171 to which an arm 172 is rigidly attached. The outer end of arm 172 is pivotally attached at 173 to a crank arm 174 which is pivotally mounted on a pin 176 stationarily attached to receiver housing 17. Crank arm 174 carries latches 18. Movement of housing 171 in an upward direction as viewed in FIG. 3 causes crank arm 174 to pivot clockwise about pivot 176 and move latch 18 into housing 17 to engage groove 19 in the nozzle 13 when the latter has fully entered housing 17. At this time latch 18 also closes switch 178 to light a signal light for indicating that the nozzle is latched to the receptacle.

Within latch cylinder housing 171 is a piston 180 attached to a rod 181 that projects from the housing 171 and has its outer end pivotally connected to another crank arm 174' pivoted on another pin 176' and carrying another latch 18. When piston 180 moves downwardly as viewed in FIG. 3 it causes arm 178' to pivot counter clockwise about pin 176' and move latch 18 into housing 17 to also engage groove 19 in nozzle 13.

Piston 180 divides cylinder housing 171 into two chambers 183 and 184. See FIG. 8. Within piston 180 and rod 181 is a valve chamber 185 that communicates with chamber 183 by way of a port 187 and with chamber 184 by way of angled port 188. A relief valve 190 is normally urged to a position for closing port 188 by a spring 191. A conduit 192 connects chamber 184 with another conduit 193 that is connected to conduit 117. Another conduit 195 connects chamber 183 to chamber 147.

OPERATION

Before a fueling operation is to begin, the parts of the mechanism within box 14 for opening door 11 and for actuating the latches 18 are in the position shown in FIG. 3. In this position cable 71 is in retracted position, door cylinder piston rod 42 is locked in fully retracted position by engagement of roller 52 with lock collar surface 55, valve 91 is closed against seat 118 to isolate conduit 117 and all other parts of the hydraulic system from pressure supply conduits 124, 120 and 119. Solenoid 168 is deenergized so that armature 156 and pin 155 are retracted as shown. At this time there is no fluid pressure in line 145 and spring 144 prevents plunger 143 from entering slot 131 in cam arm 68.

Manual pulling of cable 71 first takes up the lost motion at 69, then cam arm 68 is pivoted counter clockwise about pin 58. The first part of this pivoting motion causes link 80 to move to the right and permit valve 83 to engage seat 109 to close off conduit 100 from conduit 106. The next portion of the travel causes cam surface 72 to lift roller 52 out of engagement with lock collar surface 155 and into engagement with arm 87 to pivot rocker 85 counter clockwise whereby arm 88 moves plunger 90 to unseat valve 91 to open conduit 117 to pressure supplied conduit 119. As rocker 85 pivots, tab 95 moves up to release plunger 93 which moves to the right underneath tab 95, as shown in FIG. 4, to prevent return (clockwise) movement of rocker 85. Counter clockwise movement of cam arm 68 also causes roller 52 to enter detent 77 for holding the left end of link 50 in its raised position. In this position it closes switch 54 to light a lamp, not shown, to indicate that the door is no longer locked closed.

Opening of valve 91 permits fluid under pressure from conduits 119, 120, 124 to enter conduits 117, 193, 149, 192, 195 and 145. Pressure fluid from conduit 117 enters door cylinder chamber 100 and passes through orifice 99 to chamber 103. Because the area of piston 43 exposed to chamber 103 is greater than the area exposed to chamber 100, piston 43 and rod 42 will move to the right to the extended position shown in FIG. 4. As piston 43 extends fluid will also pass from chamber 103 to chamber 102 to keep the latter filled as it enlarges with extension of the piston. Such extension causes arm 30 to pivot counter clockwise and move door 11 to its open position as shown in FIG. 2. This opening movement of arm 30 to door opening position is assisted by spring 37. When the piston rod 42 has been fully extended spring pressed plunger 61 moves upward and pivots arm 57 counter clockwise so that outer end 63 is behind collar 49 to lock the piston rod in its extended position with door 11 fully open. Upward movement of plunger 61 closes switch 62 to light a lamp (not shown) for indicating that the door is locked open.

As the door 11 moves to open position solenoid 168 remains deenergized and ball valve 154 is held off of seat 148 by fluid pressure in conduit 149. Pressurized fluid thus has access to chamber 183 of latch cylinder 171 via conduit 195 and also has access to chamber 184 via conduit 192. Because the pressures in chambers 183 and 184 are equal, valve ball 190 remains seated to close off port 188 so that there is no transfer of fluid from chamber 183 to chamber 184 through port 188 and piston 180 remains stationary. Meanwhile pressure in line 145 forces plunger 143 down to enter opening 132 in arm 68.

The receptacle is now ready to receive nozzle 13.

The nozzle is guided toward housing 17 by sliding on door 11 and between side plates 27. As the nozzle enters housing 17 it engages sleeve valve 20 and moves it away from seat member 200. At the same time, seat member 200 opens a poppet (not shown) in the nozzle to thus open a flow path from the nozzle to the receptacle conduit 21. As the nozzle reaches its final position, flange 24 on sleeve valve 20 pivots arm 22 to actuate a switch 23 that energizes solenoid 168. This causes armature 156 and pin 155 to move to the right to force ball valve 154 against seat 148 to close off pressure conduit 149 from chamber 147. This connects latch cylinder chamber 183 to reservoir R via conduit 195, chamber 147, conduit 151, chamber 152 and conduit 111.

At this time conduit 192, chamber 184 and port 188 remain pressurized. Valve 190 is in the nature of a relief valve and remains seated unless the pressure in port 188 exceeds a preselected value. The pressure in chamber 184 now moves piston 180 to retracted position within cylinder housing 171, which causes both the rod 181 and the housing 171 to move toward each other and thus cause arms 174, 174' to pivot and cause both latches 18 to move inwardly and engage groove 19 of the nozzle to lock the nozzle in its position within housing 17. Movement of the latches 18 to their lock positions closes switch 178 to light a lamp (not shown) for signalling that the nozzle is locked into its fueling position.

Meanwhile conduit 145 is connected to reservoir via chambers 147, 152 and conduit 111 to drop the pressure behind plunger 143 whereby spring 144 raises this plunger and permits spring 137 to raise plunger 136 so that the latter enters opening 132 in rim 130 to lock arm 68 in place so that it cannot be inadvertently moved by pushing in cable 71. A suitable valve in the tanker aircraft may then be opened to permit fuel to flow from the tanker plane to the receiver plane.

Upon completion of the fueling operation, the flow of fuel will be shut off by other devices and the pilot in either aircraft can then operate a switch, not shown, for deenergizing solenoid 168. This permits spring 158 to move armature 156 to the left to release ball valve 151 from seat 148 so that pressurized fluid from line 149 can enter chamber 147 and line 145 to press plunger 143 downwardly to enter opening 132 in arm 68 and push plunger 136 out of opening 132 to release cam arm 68. Meanwhile, pressurized fluid from conduit 149 passes through chamber 147 and conduit 195 to latch cylinder chamber 183 and also continues to pass from conduit 192 to chamber 184. Because piston 180 has a larger area exposed to chamber 183 than to chamber 184 piston 180 moves to extend rod 181 to withdraw latches 18 from nozzle groove 19 whereby the nozzle may be withdrawn from housing 17. This permits sleeve valve 20 to be moved to its closed position by spring 201 against seat member 200 and thereby releasing arm 22 to permit switch 23 to open for signalling that the valve is closed.

Cable 71 may now be pushed inwardly to pivot cam arm 68 clockwise about pivot 58 and simultaneously rotate arm 57 clockwise by contact of edge 64 with pin 60 to release lock collar 49 and to open switch 62 causing the lamp connected thereto to go out to signal that the door is no longer locked open. Further, clockwise pivoting of cam arm 68 causes valve 83 to open, thus dropping the pressure in chamber 103 by connecting it to reservoir R. Pressure in door cylinder chamber 100 now starts to retract piston 43 and rod 42 so that arm 30 starts to pivot clockwise for pulling door 11 rearwardly and upwardly toward closed position. Because of the high pressure drop across orifice 99 the pressure in chamber 100 remains high relative to that in chamber 103 so that high force is exerted on the right hand side of piston 43 tending to retract the piston rapidly. Chamber 102 and orifice 105 are provided to slow down the retracting movement of the piston without reducing the retracting force on the piston. Otherwise if retraction is slowed by enlarging orifice 99 to decrease the retraction speed, there would be insufficient force to effect final closure of the door.

When piston 43 is fully retracted, lock collar 49 will have passed to the left of link 50 and roller 52 will drop against surface 55 as link 50 rotates slightly counter clockwise. Lock collar 49 in this position moves plunger 93 to the left whereupon rocker 85 pivots clockwise so that tab 95 engages and retains plunger 93 and arm 85 has moved rightwardly enough to permit spring 92 to close against seat 118 to shut off flow of pressure fluid from conduit 119 to conduit 117, all as shown in FIG. 3. The door 11 is now fully closed and locked and the parts are in their initial position for start of another fueling operation.

In the event of failure of the hydraulic system to deliver pressure fluid to the system, the device may still be operated for accomplishing a fueling operation. Thus, pulling cable 71 to its "out" position rotates cam arm 68 counter clockwise to raise roller 52 out of engagement with lock collar surface 55 whereby the door cylinder rod is unlocked and spring 37 rotates arm 30 counter clockwise to the position shown in FIG. 4 for opening door 11. Because fluid may circulate from chamber 100 to chamber 103 through orifice 99 piston 43 may readily move and spring 37 will cause extension of rod 42 for opening of the door. When the door is fully open, door cylinder rod 42 will be fully extended and arm 63 will have engaged the lock collar 49 as shown in FIG. 4 for locking the door in open position.

The fueling nozzle now may be inserted as before until it engages and opens sleeve valve 20. Because of the lack of hydraulic pressure, latches 18 will not be actuated to engage nozzle groove 19. However, fuel may be transferred because as long as the nozzle is inserted far enough to open sleeve valve 20, the nozzle valve will also be open. If the nozzle is retracted either accidentally or intentionally so that sleeve valve 20 closes, the nozzle valve will also close so that there will be minimal spillage of fuel.

We claim:

1. A device for opening a door on an aircraft to expose a refueling receptacle having latches to lock a nozzle to the receptacle, said device comprising a hydraulic door actuator having a rod connectable to said door for moving the door to open position when the rod is extended and to closed position when the rod is retracted, a piston connected to the rod and dividing the door actuator into first and second chambers, an inlet for pressurized fluid, a single supply conduit connecting the inlet to the door actuator and connected to one of said chambers, a first valve in said supply conduit and normally closed to isolate the inlet from said supply conduit, uplock means, first means movable from a first position in which it permits said uplock means to lock the rod in retracted position to a second position in which it moves said uplock means to a rod unlock position, valve opening means movable by the first means to a position for opening said first valve when the first means is moved toward its second position whereby pressurized fluid from the inlet passes through said supply conduit to said door actuator for extending said rod, and means for moving said first means.

2. The device of claim 1 in which there is a downlock means, means for moving and holding said downlock means to and in a position for locking said rod in extended position, said first means engaging said downlock means for moving the same to a position for unlocking the rod when the first means is moved toward its first position.

3. The device of claim 1 in which there is a nozzle latch carried by the receptacle movable to positions for latching and unlatching the nozzle relating to the receptacle, a hydraulic latch actuator having a rod which when extended holds the nozzle latch in a nozzle release position and when retracted holds the nozzle latch in a nozzle latch position, latch valve means normally in a position conditioning supply of pressurized fluid from said supply conduit to said latch actuator in a manner to cause the latch rod to be extended, means actuated upon insertion of the nozzle into the receptacle to move said latch valve means to another position in which it conditions supply and exhaust of said pressurized fluid to and from said latch actuator in a manner for retracting said latch actuator rod, and another means for actuating said latch valve to its normal position.

4. The device of claim 3 in which said another means is a manually actuated solenoid.

5. The device of claim 3 in which said latch actuator has a piston connected to the latch actuator rod, said supply conduit is constantly connected to one side of the latch actuator piston, and said latch actuator valve controls flow of said pressurized fluid to and from the other side of said latch actuator piston.

6. The device of claim 5 in which said one side of said latch actuator piston has a smaller area exposed to pressurized fluid than has the other side when fluid under pressure is on both sides of the piston.

7. The device of claim 3 in which there is a second means for locking said first means in its second position when said nozzle latch is in nozzle locking position.

8. The device of claim 7 in which said second means includes a plunger held in engagement with said first means by spring pressure when said latch actuator rod is retracted and which is held out of engagement with said first means by a hydraulic plunger when the latch actuator rod is extended.

9. The device of claim 8 in which said latch valve means controls flow of said pressurized fluid to and from said hydraulic plunger.

10. The device of claim 8 in which said first means has an opening to receive said spring pressed plunger and has a slot narrower in width than said opening and which receives the hydraulic plunger when the latter holds the spring pressed plunger out of engagement with the first means when the latter is in its second position.

11. The device of claim 1 in which said first means has a cam surface engageable with the uplock means for moving the uplock means to its rod unlock position and also has a detent for holding the uplock arm in its unlock position.

12. The device of claim 1 in which said valve opening means includes a pivotal rocker movable by the uplock means for opening said valve.

13. The device of claim 12 in which there is a plunger engageable with a portion of the rocker for holding the rocker in valve closed position when the uplock means is in its rod locking position and which is movable to engage another portion of the rocker for holding it in its valve opening position when the uplock arm is in its rod releasing position.

14. The device of claim 13 in which said plunger is spring pressed toward its position for engaging said portion for holding the rocker in its valve opening position and which is retracted by said door actuator rod when in its position for engaging said portion.

15. The device of claim 1 in which there is a door valve controlling exhaust of fluid from said door actuator, means for holding said door valve open when said first means is in said first position, and means for closing said door valve when said first means is in its second position.

16. The device of claim 1 in which said door actuator includes a piston attached to said door actuator rod and dividing said actuator into first and second chambers, said piston having a relatively small area exposed to fluid in the first chamber and a larger area exposed to fluid in the second chamber, said first chamber being constantly open to pressurized fluid in said supply conduit when said valve is open, means to admit pressurized fluid from the supply conduit to said second chamber, and means to exhaust pressurized fluid from said second chamber when said first means is in said first position, and means to trap pressurized fluid in said second chamber when said first means is in said second position.

17. The device of claim 16 in which said means to exhaust and trap fluid includes a valve means actuable to trap position by a spring and to exhaust position by said first means when the latter is in its first position.

18. The device of claim 16 in which there is a hydraulic means to retard the speed of movement of the door actuator rod.

19. The device of claim 18 in which said hydraulic means includes a chamber in the door actuator rod and a restricted orifice to admit and discharge fluid from said second chamber to and from said rod chamber.

20. The device of claim 18 in which said orifice is in a fixed plug member projecting into said rod chamber and having a sliding fit with the wall of said rod chamber.

21. The device of claim 16 in which said means to admit fluid from the supply conduit to the second chamber comprises a restricted passage through said piston connecting said chambers.

22. A device for opening a door on an airplane to expose a refueling receptacle having means to connect to a fueling nozzle, said device comprising a hydraulic door actuator having a rod for moving the door to open and closed positions, an inlet for pressurized fluid, a single first conduit connecting said inlet to said door actuator, a first valve normally closing said first conduit to isolate said door actuator from said inlet, control means for opening said first valve to direct pressurized fluid through said first conduit to said door actuator to operate the same for moving the door, conduit means for connecting said door actuator to a reservoir, a second valve in said conduit means and responsive to said control means for controlling flow through said conduit means to control movement of the door, and means operable by the nozzle when fully received by the receptacle for latching the nozzle to the receptacle.

23. The device of claim 22 in which there is an uplock means for locking the door actuator rod in door closing position, and movable means for unlocking the uplock means prior to opening of the valve means.

24. The device of claim 23 in which there is a downlock means for locking the door actuator rod in its door opening position, means for releasing the nozzle latching means, and means operable subsequent to release of the nozzle latching means for releasing the downlock means, and means for actuating the door actuator in a direction for closing said door after release of the downlock means.

25. The device of claim 24 in which there is a spring operated means to prevent release of the downlock means prior to release of the nozzle latching means.

26. The device of claim 25 in which there is a hydraulically operated means to move said spring operated means to a position for releasing the downlock means after release of the nozzle latch means.

27. The device of claim 22 in which said conduit means is a single second conduit connecting said door actuator to the reservoir.

28. The device of claim 27 in which said door actuator has a piston dividing said actuator into first and second chambers, a restricted passage connecting the two chambers, said first conduit connected to the first chamber and the second conduit connected to the second chamber.

29. The device of claim 28 in which said piston has a larger area exposed to fluid pressure in the second chamber than in the first chamber.

30. The device of claim 29 in which said second valve is normally closed and said control means includes an arm movable between a door open position and a door closed position, first means movable by said arm to a position for opening said first valve when said arm is moved towards its door open position, and second means movable by said arm to a position for opening said second valve when said arm is moved towards its door closed position.

31. The device of claim 30 in which said arm when moving from its door open position to its door closed position opens said second valve before permitting said first valve to close.

32. The device of claim 31 in which said control means further includes means for holding said first valve open until the door closes as said arm is moved to its door closed position.

33. The device of claim 27 in which there is a means to prevent rapid movement of said door actuator.

34. A device for opening a door on an aircraft to expose a refueling receptacle comprising a hydraulic door actuator having an extendable and retractable rod for opening and closing the door, mechanical lock means for locking said rod in one position against movement in one direction, lock release means for releasing said lock means, and means actuated by said lock means as it is released for directing pressure fluid to said door actuator to move said rod in said one direction from said one position.

35. The device of claim 34 in which said means for directing includes valve means for controlling flow of pressure fluid to said door actuator and valve control means movable by said lock means for controlling said valve.

36. The device of claim 35 in which said valve control means includes a pivoting rocker engageable at one end with said lock means and at its other end with said valve means.

37. The device of claim 36 in which said rocker is pivotally mounted on said lock release means.

38. The device of claim 34 in which said lock release means includes a rotary cam plate having a cam surface engageable with said lock means for moving said lock means to its rod unlocked position.

39. A device for opening a door on an airplane to expose a refueling receptacle having latches to lock a nozzle to the receptacle, comprising a hydraulic door actuator for opening and closing the door, valve means for controlling flow of fluid to the actuator, control means for controlling said valve means and movable to a first position to cause said valve means to condition flow to and from said door actuator for opening the door and to a second position to cause said valve means to condition flow to and from said door actuator for closing the door, a hydraulic latch actuator for extending and retracting the latches, latch valve means for controlling flow of fluid to and from said latch actuator and having a normal position for causing said latch actuator to retract the latches, switch means actuated by the nozzle for causing said latch valve means to move to another position for causing said latch actuator to extend the latches, and means for locking said control means in its first position when the nozzle latch is in its extended position, said means for locking said control means including a plunger held in engagement with said control means by spring pressure when said switch means is actuated by the nozzle and which plunger is held out of engagement with said control means by a hydraulic plunger when said switch means is no longer actuated by the nozzle.

40. The device of claim 39 in which said control means has an opening to receive said spring pressed plunger and a slot narrower in width than said opening which receives the hydraulic plunger when the latter holds the spring pressed plunger out of engagement with said control means.

41. A device for opening a door on an airplane to expose a refueling receptacle comprising a hydraulic door actuator having an extendable and retractable rod respectively for opening and closing the door, a single conduit for connecting a source of pressurized fluid to said actuator, a valve in said conduit normally for closing said conduit, valve control means movable from a valve closed position to a valve open position to supply pressurized fluid to said actuator for extension and retraction of said ram, and means movable to one position upon extension of said rod for holding said valve control means in its valve open position and movable to another position by said ram when in its retracted position to permit said valve control means to return to its valve closed position.

42. A device for opening a door on an airplane to expose a refueling receptacle comprising a hydraulic door actuator connectable to the door for moving the door to open and closed positions, first locking means holding the door actuator in a door closed or open position, release means for releasing said first locking means, a rocker arm pivotally carried on said release means and movable by said first locking means, and means responsive to such movement of said rocker arm for controlling flow of pressure fluid to said door actuator for moving the door to its other position.

43. A device for opening a door on an airplane to expose a refueling receptacle comprising a hydraulic door actuator having a rod for moving the door to open position when the rod is extended and to closed position when the rod is retracted, a piston connected to the rod and dividing the door actuator into first and second chambers, said piston having a relatively small area exposed to fluid in said first chamber and a larger area exposed to fluid in said second chamber, first means for supplying pressurized fluid to said first chamber, second means for controlling exhausting of fluid from said second chamber when said first chamber is pressurized, and passage means connecting said first and second chambers, said passage means having therein an orifice for restricting flow through said passage.

44. The device of claim 43 in which there is hydraulic means for retarding the speed of movement of said rod.

45. The device of claim 44 in which said hydraulic means includes a rod chamber in said rod and a restricted orifice to admit and discharge fluid from said second chamber to and from said rod chamber.

46. The device of claim 45 in which said restricted orifice is in a fixed plug member projecting into said rod chamber and having a sliding fit with the wall of said rod chamber.

* * * * *